United States Patent
Kobayashi et al.

(10) Patent No.: US 7,300,895 B2
(45) Date of Patent: *Nov. 27, 2007

(54) ELASTICALLY STRETCHABLE COMPOSITE SHEET AND PROCESS FOR MAKING THE SAME

(75) Inventors: Toshio Kobayashi, Kagawa-ken (JP); Hiroyuki Ohata, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 1317 days.

This patent is subject to a terminal disclaimer.

(21) Appl. No.: 09/766,275

(22) Filed: Jan. 19, 2001

(65) Prior Publication Data

US 2001/0009715 A1    Jul. 26, 2001

(30) Foreign Application Priority Data

Jan. 20, 2000    (JP) .............................. 2000-011994

(51) Int. Cl.
*D04H 1/00* (2006.01)
*D04H 3/00* (2006.01)
*D04H 5/00* (2006.01)
*D04H 13/00* (2006.01)

(52) U.S. Cl. ...................... 442/329; 442/328; 442/381; 442/394

(58) Field of Classification Search .............. 442/328, 442/329, 389, 394, 381; 428/196, 198, 292.1; 156/291

See application file for complete search history.

(56) References Cited

U.S. PATENT DOCUMENTS

| | | | |
|---|---|---|---|
| 4,107,364 A | 8/1978 | Sisson | 428/196 |
| 4,663,220 A * | 5/1987 | Wisneski et al. | 428/221 |
| 5,116,662 A * | 5/1992 | Morman | 428/198 |
| 5,615,460 A | 4/1997 | Wierich et al. | 24/446 |
| 5,681,645 A * | 10/1997 | Strack et al. | 428/196 |
| 5,683,787 A | 11/1997 | Boich et al. | 428/198 |
| 5,939,178 A | 8/1999 | Boich | 428/198 |
| 6,372,067 B1 * | 4/2002 | Kobayashi et al. | 156/73.1 |
| 6,531,014 B1 * | 3/2003 | Kobayashi et al. | 156/181 |
| 6,613,260 B2 * | 9/2003 | Kobayashi et al. | 264/171.13 |
| 6,712,921 B2 * | 3/2004 | Mitsuno et al. | 156/164 |

(Continued)

FOREIGN PATENT DOCUMENTS

DE     195 23 497 A1    1/1997

(Continued)

OTHER PUBLICATIONS

Hytrel TEEE Product Specification.*

(Continued)

*Primary Examiner*—Terrel Morris
*Assistant Examiner*—Jennifer Chriss
(74) *Attorney, Agent, or Firm*—Butzel Long

(57) ABSTRACT

A sheet-like fibrous assembly having an inelastic stretchability is intermittently joined to at least one surface of an elastically stretchable sheet. The elastic sheet is elastically stretchable at least 80% in one direction and the fibrous assembly is curved between each pair of binding spots adjacent to each other on the elastic sheet so as to be stretchable in the one direction and comprises ethylene/propylene copolymer, ethylene/propylene/butene copolymer or a mixture of two or more of these copolymers at 100~10% by weight.

5 Claims, 3 Drawing Sheets

U.S. PATENT DOCUMENTS

| | | | |
|---|---|---|---|
| 2002/0037678 A1* | 3/2002 | Ohata | 442/328 |
| 2002/0053755 A1* | 5/2002 | Kobayashi et al. | 264/173.19 |
| 2002/0061390 A1* | 5/2002 | Kobayashi et al. | 428/198 |

FOREIGN PATENT DOCUMENTS

| | | |
|---|---|---|
| DE | 196 47 459 A1 | 5/1998 |
| EP | 0 432 763 A1 | 6/1991 |
| EP | 0 935 035 A1 | 8/1999 |
| EP | 1 069 223 A1 | 1/2001 |
| FR | 2 748 279 A1 | 11/1997 |
| JP | A 6-184897 | 7/1994 |
| JP | A 8-504693 | 5/1996 |

OTHER PUBLICATIONS

European Search Report dated Aug. 7, 2001.

* cited by examiner

ELASTICALLY STRETCHABLE COMPOSITE SHEET AND PROCESS FOR MAKING THE SAME

BACKGROUND OF THE INVENTION

This invention relates to a composite sheet having an elastic stretchability and more particularly to a composite sheet comprising an elastic sheet and an inelastic sheet-like fibrous assembly.

Japanese Patent Publication of PCT International Application No. 1996-504693 describes a multilayered elastic panel comprising at least a rubber-based elastic layer and at least one inelastic fibrous layer and a process for making the same. In this panel, the inelastic fibrous layer is joined to the rubber-based elastic layer at binding spots spaced one from another and forms gathers between each pair of the adjacent binding spots. The inelastic fibrous layer in this panel is stretched near to its breaking extension in the course of the process. This process of prior art for making the panel comprises the steps of placing the inelastic fibrous layer in which the component fibers are not stretched at all or partially stretched upon the rubber-based elastic layer in its relaxed condition, heat-sealing or adhesively bonding these two layers to each other at the binding spots spaced one from another, then stretching these two layers close to a breaking extension of the inelastic fibrous layer and finally relaxing them again. When such panel is used for disposable diapers or the like, the inelastic fibrous layer in the panel obtained in this manner offers an advantageous characteristics peculiar to a fabric preventing the rubber-based elastic layer comprising an elastic film or the like from coming in direct contact with a diaper wearer's body. Depending on choice of the inelastic fibrous layer, the panel surface offers soft, fluffy and comfortable touch and, in addition, can absorb body fluids discharged thereon.

Japanese Patent Publication A No. 1994-184897 describes a composite stretchable sheet material which is stretchable at least in two directions and a process for making the same. This composite stretchable sheet material comprises at least one stretchable sheet and at least one necked sheet material joined to the stretchable sheet at least at three points arranged nonlinearly. The necked sheet material forms shrinkage between each pair of the adjacent points. The process for making such composite stretchable sheet material comprises the steps of stretching the sheet material adapted to be necked and thereby necking this sheet material, placing the necked sheet material being under a stretching force upon the stretchable sheet also under a stretching force, joining these two sheets at three points arranged nonlinearly, then relaxing the stretchable sheet and finally relaxing the necked sheet material between at least two of three binding points. According to an embodiment described in this Publication, polypropylene fiber obtained by spun bond method is used as the sheet material to be necked.

No specific example of the inelastic fibrous layer is described in said Japanese Patent Publication of PCT International Application No. 1996-504693.

The composite stretchable sheet material described in the Japanese Patent Publication A No. 1994-184897 has its basis weight larger than the basis weight of the fed raw material since the sheet to be necked is fed and joined with tension to the stretchable sheet and then these sheets are relaxed. In this respect, the composite stretchable sheet is distinguished from the multilayered elastic panel described in the Japanese Patent Publication of PCT International Application No. 1995-504693. However, the polypropylene fiber obtained by the spun bond method used as the necked sheet material in the composite stretchable sheet material can be used also as one of the inelastic fibrous layer forming the multilayered elastic panel.

The rubber-based sheet and the inelastic fiber will be easily heat-sealed with each other when the thermal softening temperatures or melting points of these two components are close to each other. So far as it concerns, it is generally preferable that the polypropylene fiber having a relatively low thermal softening temperature is combined with the rubber-based sheet having a relatively low thermal softening temperature. The polypropylene fiber is a preferable material from the viewpoint of its relatively low cost.

It is preferred to minimize the polypropylene fiber-diameter in order to obtain the soft and fluffy inelastic fibrous layer using polypropylene fiber made by spun bond method as the prior art has been the case. However, crystallization progresses as the polypropylene fiber is stretched and thinned in the course of spinning. Consequently, it is impossible to stretch the inelastic fibrous layer of such polypropylene together with the rubber-based elastic layer at a desired high stretching ratio. The elasticity limit of the multilayered elastic panel obtained in this manner is relatively low. On the other hand, stretching of the polypropylene fiber may be moderated in the course of spinning in order to avoid a progress of crystallization and, as a result, both the inelastic fibrous layer made of the polypropylene and the rubber-based elastic layer can be stretched at a relatively high stretching ratio. In this way, the elasticity limit of the resultant multilayered elastic panel can be improved. However, such process for making the multilayered elastic panel can not reduce the fiber-diameter of the polypropylene fiber sufficiently to obtain the soft and fluffy inelastic fibrous layer. In general, it is also difficult to heat-seal the rubber-based elastic layer and the polypropylene fiber with each other so that the resultant multilayered elastic panel may present a soft touch so far as a difference of their melting points are relatively large.

SUMMARY OF THE INVENTION

It is an object of this invention to provide a stretchable composite sheet comprising an elastic layer and as inelastic fibrous layer in which a fiber-diameter is sufficiently reduced so as to improve a touch of the inelastic fibrous layer and to facilitate heat-sealing of the elastic layer and the inelastic fibrous layer with each other.

The object set forth above is achieved according to one embodiment of the invention relating to a stretchable composite sheet and to another embodiment of the invention relating to a process for making such composite sheet.

According to one embodiment, the invention provides an elastic sheet having a stretchability at least one of two directions orthogonal to each other and a sheet-like fibrous assembly having a stretchability in the one of the two directions and joined to at least one surface of the elastic sheet.

In this embodiment, the elastic sheet is stretchable in the one direction at least by 80%, and the fibrous assembly has an inelastic stretchability and is joined to the elastic sheet at binding spots arranged intermittently in the two directions. Component fibers constituting the fibrous assembly are curved between each pair of the spots adjacent to each other in the one direction i.e., longer than a dimension defined between each pair of the spots adjacent to each other and stretchable together with the elastic sheet in the one direction wherein the component fibers are formed by fibers each comprising ethylene/propylene copolymer containing ethylene at 0.5~10% by weight, ethylene/propylene/butene containing ethylene at 0.5~10% by weight and butene at 0.5~15% by weight, or a mixture of at least two selected from these copolymers at 100~10% by weight.

The stretchable composite sheet includes preferred embodiments as follow:

(1) The fibers comprise a mixture of any one of the copolymers and propylene homopolymer and the content of the homopolymer is 0~90% by weight.

(2) The elastic sheet and the fibrous assembly are heat-sealed with each other at the binding spots.

According to a process for making the composite sheet, a first web made of thermoplastic synthetic fiber and being inelastically stretchable in one direction is joined to at least one surface of a second web made of thermoplastic synthetic resin and being elastically stretchable at least in the one direction, so that the composite sheet may be elastically stretchable in the one direction.

The first web is formed by fibers each comprising ethylene/propylene copolymer containing ethylene at 0.5~10% by weight, ethylene/propylene/butene containing ethylene at 0.5~10% by weight and butene at 0.5~15% by weight, or a mixture of at least two selected from these copolymers at 100~10% by weight and has a breaking extension of at least 150%. The second web is elastically stretchable by at least 80% in the one direction. The first and second webs are joined to each other and stretched to form the stretchable composite sheet by the process comprising the steps of:

a) continuously feeding the first web in the one direction;

b) continuously feeding the second web in the one direction and placing the second web upon the first web;

c) joining the first and second webs having been placed upon each other in step b) to each other intermittently in the one direction and in the direction orthogonal to the one direction, at least in the one direction;

d) stretching the first and second webs having been jointed to each other in step c) in the one direction and the direction orthogonal to the one direction, at least in the one direction within an elasticity limit of the second web and within a breaking extension of the first web; and e) leaving the first and second webs having been stretched in step d) contract to obtain the composite sheet.

DETAILED DESCRIPTION OF THE PREFERRED EMBODIMENTS

Details of an elastically stretchable composite sheet and a process for making the same according to this invention will be more fully understood from the description given hereunder with reference to the accompanying drawings.

Figure 1:
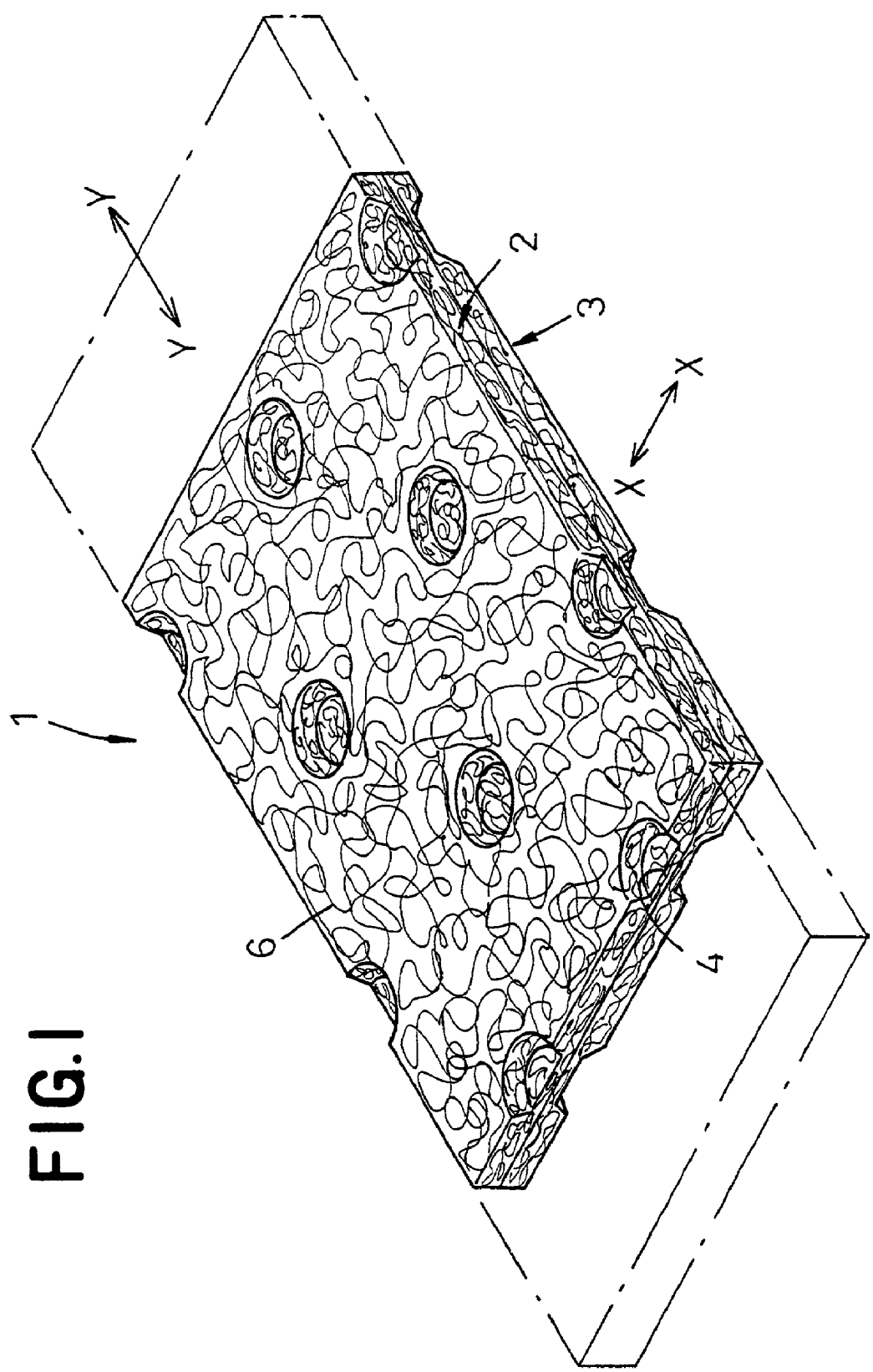
FIG. 1 is a perspective view depicting an elastically stretchable composite sheet according to this invention.

An elastically stretchable composite sheet depicted in FIG. 1 in a perspective view comprises an upper layer 2 and a lower layer 3 bonded together by heat-sealing them with each other at a plurality of binding spots 4. The composite sheet 1 has directions indicated by double-headed arrows X-X and Y-Y orthogonal to each other and is elastically stretchable at least in the direction Y-Y as indicated by imaginary lines.

The upper layer 2 of the composite sheet 1 is inelastically stretchable at least in the direction Y-Y of the two directions X-X and Y-Y. This upper layer 2 is an assembly of continuous fibers 6 made of thermoplastic synthetic resin, in which the individual continuous fibers 6 are preferably heat-sealed with one another exclusively at the binding spots 4 and not in a region extending around the binding spots 4. Between each pair of the binding spots 4 being adjacent to each other in the direction Y-Y, the respective continuous fibers 6 describe an irregular curve longer than distance in a straight line between these adjacent binding spots 4 and extend on the top surface of the lower layer 3. The continuous fibers 6 are reoriented to extend in a straight line between each pair of the binding spots 4 adjacent to each other in the direction Y-Y as the composite sheet 1 is stretched in the direction Y-Y.

Such continuous fibers 6 may be those of ethylene/propylene random copolymer containing 0.5~10% by weight of ethylene, or ethylene/propylene random copolymer containing 0.5~10% by weight of ethylene and 0.5~15% by weight of butene or those containing 100~50% by weight of one of these copolymers. The continuous fibers 6 may contain, in addition to these copolymers, 0~90% by weight of propylene homopolymer.

The lower layer 3 of the composite sheet 1 is formed from a sheet elastically stretchable in the direction Y-Y, preferably in the direction Y-Y as well as in the direction X-X at least by 80%, preferably by 200% and elastically contractable to less than 1.3 times of its initial length after it has been stretched by 80%. Such lower layer 3 may be formed from a card web made of elastic yarn, a melt blown nonwoven fabric made of elastic yarn, a spun lace nonwoven fabric made of elastic yarn, a woven fabric made of elastic yarn, a film made of thermoplastic elastomer or the like. The thermoplastic elastomer may be olefine-, styrene-, ester-, urethane-based elastomer or the like.

It is possible without departing from the scope of this invention to bond these upper and lower layers 2, 3 together using a supersonic sealing technique instead of using a heat-sealing technique. If the continuous fibers 6 of the upper layer 2 and the texture of the lower layer 3 allow them to be joined together using a mechanical intertwining technique, still another processing such as needle punching or high pressure columnar water stream ejection can be adopted as means of such mechanical intertwining. Preferably, each of the binding spots 4 has an area of 0.03~10 mm$^2$ and a total area of the binding spots 4 occupies 1~50% of the area of the composite sheet 1.

Stretching the composite sheet 1, for example, in the direction Y-Y causes the lower layer 3 to be elastically stretched in the direction Y-Y and the lower layer 3 stretched in this manner forces the continuous fibers 6 of the upper layer 2 to be reoriented and to be inelastically stretched in the direction Y-Y. A force required to stretch the composite sheet 1 is substantially equal to a force required to stretch the lower layer 3 alone. This is for the reason that the continuous fibers 6 of the upper layer 2 are merely reoriented as the composite sheet 1 is stretched and the upper layer 2 therefore has almost no influence on the force required to stretch the composite sheet 1. As the composite sheet 1 is further stretched with the lower layer 3 being elastically deformed, the continuous fibers 6 more or less curved theretofore are straightened between respective pairs of the binding spots 4 adjacent in the direction Y-Y. A force required to stretch the composite sheet 1 still further from this state is equal to the force required to stretch the lower layer 3 plus the force required to stretch the continuous fibers 6 which have already been straightened.

Figure 2:
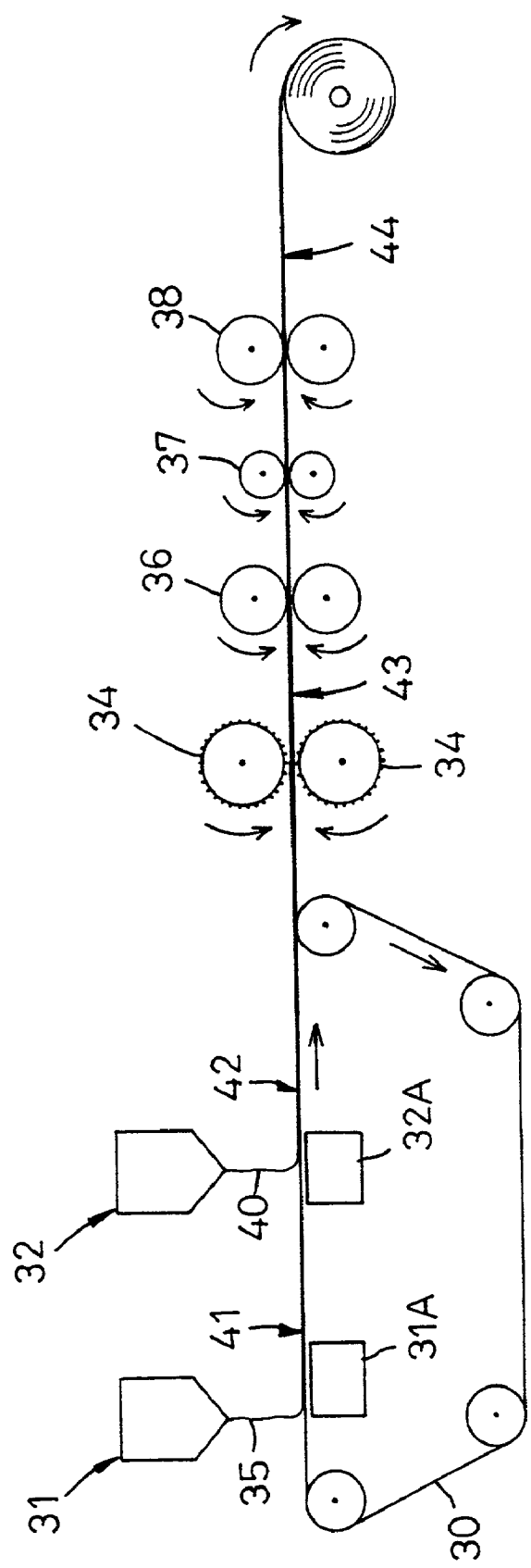
FIG. 2 is a diagram schematically illustrating an embodiment of a process according to this invention for making the elastically stretchable composite sheet.

FIG. 2 is a diagram schematically illustrating an embodiment of the process for making the composite sheet 1. An endless belt 30 runs from left to right as viewed in FIG. 2. On the left-hand side, a first extruder 31 for making a spun bond nonwoven fabric is provided above the belt 30 and a suction mechanism 31A is provided below the belt 30. The first extruder 31 has a plurality of nozzles arranged transversely of the belt 30. These nozzles discharge first continuous fibers 35 of ethylene/propylene random copolymer containing ethylene by 2% by weight (MI=45 g/10 min, melting pint of 140° C. as measured according to Japanese Industrial Standards K67582) which are stretched and thinned to a fiber-diameter smaller than 17 μm, for example, a fiber-diameter of 11 μm as they are discharged from the nozzles. The first continuous fibers 35 are accumulated on the belt 30 so as to describe irregular curves and thereby to form a first web 41 which is equivalent to a spun bond nonwoven fabric. Preferably, the condition under which the nozzles should discharge the first continuous fibers 35 and the condition under which the belt 30 runs are set up to meet a requirement as follows: In the first web 41, the continuous fibers 35 accumulated and placed one upon another on the belt 30 should not be tightly sealed one with another and, even if sealed one with another, they could be easily separated one from another in the subsequent step. The first continuous fibers 35 of the copolymer are capable of maintaining a breaking extension of at least 150% even after stretched and thinned since no significant crystallization progress occurs in these continuous fibers 35.

On the right of the first extruder 31, there are provided a second extruder 32 for making a melt blown nonwoven fabric and a suction mechanism 32A. The second extruder 32 also has a plurality of nozzles arranged transversely of the belt 30. These nozzles discharge second melt blown continuous fibers 40 having a fiber-diameter of 12 μm at a rate of 30 g/m² onto the first web 41. These continuous fibers 40 are made of elastically stretchable thermoplastic synthetic resin, for example, of styrene-based elastomer having MI=70 g/10 min and melting point of 80° C. as measured according to JIS K67582. The second melt blown continuous fibers 40 are accumulated on the first web 41 so as to describe irregular curves and thereby to form a second web 42. The condition under which the second extruder 32 operates is set up so that the second continuous fibers 40 in the second web 42 may be placed upon and sealed with one another to form a sheet which is elastically stretchable in the running direction of the belt 30, preferably in the running direction as well as in the direction orthogonal thereto. The second web 42 is elastically stretchable by at least 80% and, in the case of the styrene-based elastomer, by approximately 700% at least in the running direction of the belt 30. The second continuous fibers 40 preferably have a breaking extension higher than that of the first continuous fibers 35.

The first and second webs 41, 42 placed upon each other pass through a nip defined between vertically paired embossing rolls 34, 34 whereupon these two webs 41, 42 are pressed against each other under heating intermittently at least longitudinally of them in which they travel, preferably also in the direction orthogonal thereto so that these first and second webs 41, 42 may be intermittently heat-sealed with each other to form a first composite web 43.

The first composite web 43 then pass through nips defined between first, second and third pairs of rolls 36, 37, 38, respectively. The first and third pairs of rolls 36, 38 rotate at a common velocity higher than a velocity at which the second pair of rolls 37 rotate. The differential velocity between the first and second pairs of rolls 36, 37 is set up so that the first composite web 43 may be stretched to a desired ratio at a room temperature in the order of 10~60° C., preferably in the order of 15~40° C. Subsequently between the second and third pairs of rolls 37, 38, the first composite web 43 elastically contracts to its initial length to form a second composite web 44.

Stretching of the first composite web 43 causes the first continuous fibers 35 in the first web 41 to be stretched within its breaking extension between each pair of the adjacent regions in which the first continuous fibers 35 have been heat-sealed one with another and thereby to be plastically deformed. As a result, the first continuous fibers 35 get their length enlarged and their fiber-diameter reduced. At the same time, the second web 42 formed by the second continuous fibers 40 is elastically stretched between each pair of the adjacent regions in which the second continuous fibers 35 have been heat-sealed one with another within the elastic limit of the second continuous fibers 40. In this step of stretching the first composite web 43, the first continuous fibers 35 of the first web 41 theretofore heat-sealed or mechanically entangled one with another are almost entirely separated one from another except the regions in which they were heat-sealed one with another by the pair of embossing rolls 35. Preferably, heat-sealing effect theretofore established between the first continuous fibers 35 and the second web 42 are also substantially dissolved in this step of stretching the first composite web 43. A ratio at which the first composite web 43 is stretched depends on the breaking extension of the first continuous fibers 35 and the elastic extension limit of the second continuous fibers 40. In general, this ratio is 50~300%.

The second composite web 44 is taken up and cut into an appropriate dimension to form a composite sheet 1. The first web 41 and the second web 42 in the second composite web 44 are destined to form the upper and lower layers 2, 3 of the composite sheet 1 shown in FIG. 1. The spots on the second composite web 44 at which it was subjected to the heat-sealing by the pair of embossing rolls 34 are destined to form the binding spots 4 on the composite sheet 1.

In this step, the pair of embossing rolls 34 may be heated at a temperature close to the melting point of the second continuous fibers 40, for example, at a relatively low temperature of 110° C. This is because that a difference of melting point between the first continuous fibers 35 and the second continuous fibers 40 is less than when the first continuous fibers 35 are made of propylene homopolymer. By heating the pair of embossing rolls 34 at such temperature, it is possible to avoid the trouble that the second continuous fibers 40 having a relatively low melting point might cling to said embossing rolls 34 or might be molten excessively, for example, over an extend larger than desired. It should be understood that, when the propylene homopolymer is used to form the first continuous fibers 35, the pair of embossing rolls must be heated at a temperature of 125~130° C. or higher and, as a result, the second continuous fibers 40 may be easily molten and cling to the embossing rolls.

The first continuous fibers 35 of ethylene/propylene copolymer do not exhibit any significant progress of crystallization even during this step of stretching and thinning. Therefore, the first continuous fibers 35 can sufficiently follow a high stretching ratio of the second continuous fibers 42 to get their fiber-diameter further thinned also when they are further stretched by the first~third pairs of rolls 36~38 in the subsequent step. For example, the first composite web 43 in which the first continuous fibers 35 have a fiber-diameter of 11 µm can be stretched by 80% in the direction Y-Y with the first continuous fibers 35 being thinned to a fiber-diameter of 9 µm. On the other hand, it was found that the continuous fibers of propylene homopolymer having a fiber-diameter of 11 µm used in the place of the first continuous fibers 35 limit a stretchability of the first composite web 43 to 60% due to crystallization of polypropylene progressing in the course of stretching. Correspondingly, a fiber-diameter reduction of the polypropylene fibers was limited to 10 µm. While the first composite web 43 using the polypropylene continuous fibers having a fiber-diameter of 22 µm in the place of the first continuous fibers 35 could be stretched by 80% without any significant crystallization of the polypropylene, a resultant fiber-diameter of the polypropylene was 19 µm. As will be apparent from these findings, use of the first continuous fibers 35 made of ethylene/propylene copolymer is advantageous in that the second composite web 44 can obtain the first web 41 of the fiber-diameter sufficiently reduced to offer a comfortable touch, a fluffiness and an appropriate bulkiness, on one hand, and can obtain a high elastic stretchability, on the other hand. In this way, the composite sheet 1 as the final product also presents a comfortable touch and a high elastic stretchability.

The first continuous fibers 35 functioning in the manner as has been described above are destined to form the continuous fibers 6 in the composite sheet 1 shown by FIG. 1. Each of the first continuous fibers 35 comprises ethylene/propylene random copolymer containing ethylene at 0.5~10% by weight, ethylene/propylene/butene random copolymer containing ethylene at 0.5~10% by weight and butene at 0.5~15% by weight, or a mixture of these copolymers at 100~10% by weight. The first continuous fibers 35 may contain, in addition to these copolymers, propylene homopolymer at 0~90% by weight.

In application of the second composite web 44, i.e., the composite sheet 1 obtained in this manner to disposable sanitary article, even if the second web 42 contains any rubber-based material, the first web 41 may be arranged to come in contact with a wearer s skin to avoid a problem that a slip-resistance peculiar to the rubber-based material might stimulate the wearer's skin. After stretched and thinned, the first continuous fibers 35 present their flexibility and touch more comfortable than immediately after they have been discharged from the extruder. So far as the first continuous fibers 35 are sealed neither with themselves nor with the second web 42 except the binding spots 4 formed by the embossing, a relatively weak force required to stretch the second web 42 alone is sufficient to initially stretch the second composite web 44. Consequently, the second composite web 44 forms a easily stretchable and flexible sheet in spite of its two-layered construction. In the process as illustrated, the first and second webs 41, 42 in the second composite web 44 have their basis weights corresponding to those immediately after they have been discharged from the extruders 31, 32, respectively. It should be understood that, after the first continuous fibers 35 have been stretched and thinned, the first web 41 become more bulky and fluffy than immediately after the first continues fibers 35 was discharged from the extruder. Furthermore, the first and second webs 41, 42 are provided in the form of fibrous assemblies and the second composite web 44 obtained from these fibrous assemblies generally present a high breathability.

This invention may be implemented also by altering the process illustrated by FIG. 2 in various manners. For example, it is possible to feed the second web 42 onto the belt 30 before the first web 41 is fed onto the belt 30 and then to feed the first web 41 onto the second web 42. It is also possible to adopt the means such as needle punching or high pressure columnar water stream ejection instead of adopting the embossing rolls 34 to join the first and second webs 41, 42 to each other. An alternative arrangement is also possible such that a third extruder is provided at the downstream of the second extruder 32. In this case, the third extruder discharges inelastically stretchable third continuous fibers similar to the first continuous fibers 35 to form a third web similar to the first web 41 on the second web 42 so that a three-layered composite sheet 1 may be obtained from the first and second webs 41, 42 and this third web. The third web may be either same as the first web 41 or different in the type of resin, the fiber-diameter and the appearance such as color.

Figure 3:
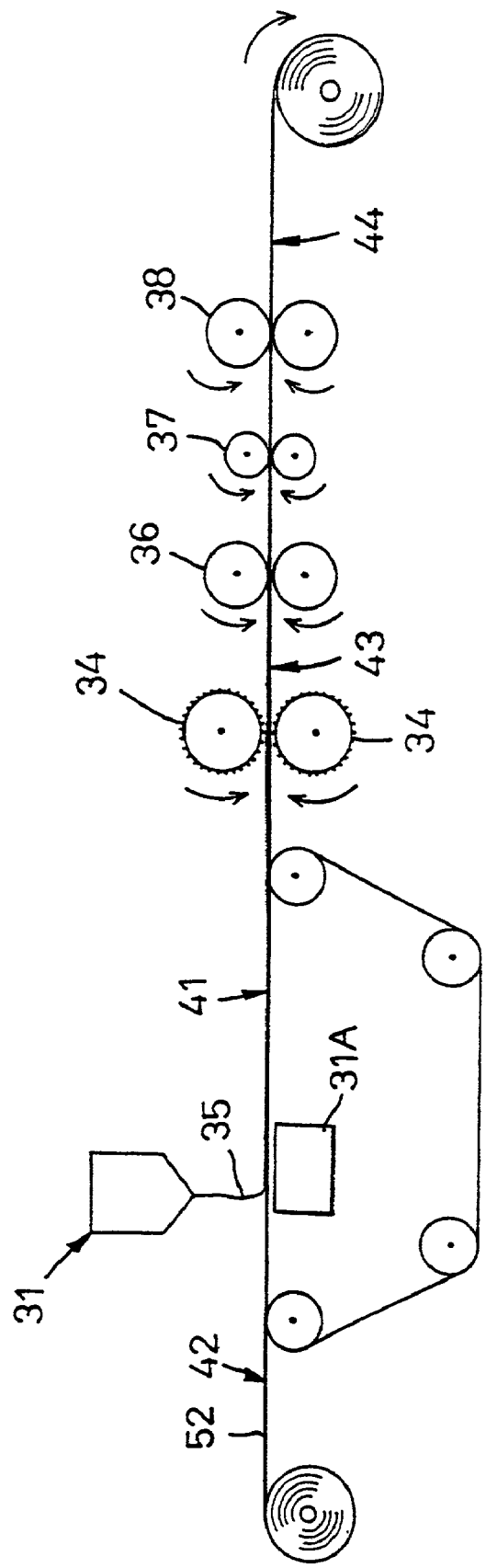
FIG. 3 is a diagram similar to FIG. 2 illustrating an alternative embodiment of the process for making the elastically stretchable sheet.

FIG. 3 is a diagram similar to FIG. 2 illustrating another embodiment of the process according to this invention. In accordance with this embodiment, the second web 42 in the form of elastically stretchable film 52 made of thermoplastic elastomer is fed from the left-hand of FIG. 3 in the running direction of the belt 30. The first web 41 comprising the first continuous fibers 35 is fed onto said film 52. These first and second webs 41, 42 travel through the nip between the pair of embossing rolls 34, 34 whereupon these first and second webs 41, 42 are intermittently heat-sealed with each other to form the first composite web 43 similarly in the process of FIG. 2. The first composite web 43 is further stretched by the first~third pairs of rolls 36~38 and then contracts to form the second composite web 44. By heat-sealing the first web 41 with the second web 42 in the form of the film 52 in this manner to form the binding spots 4 of FIG. 1, it is ensured that these first and second webs 41, 42 should not be separated from each other even when each of the binding spots 4 is dimensioned to be as small as 0.03~1 mm$^2$ or a total area of the spots 4 also is dimensioned to be as small as 1~10% of the entire surface area of the second composite sheet 44, since the first web 41 is formed by the first continuous fibers 35. It should be understood that the area of the individual binding spots 4 may be varied within a range of 0.03~10 mm$^2$ and the total area of these spots 4 may be varied within a range of 1~50% of the surface area of the second composite web 44, if it is necessary.

The composite sheet 1 obtained by the process according to this invention is ideal in its stretchability as well as its comfortable touch and suitable as fabric and elastic members used for disposable diapers, sanitary napkins, disposable pants, and disposable gowns used in the medical field.

The process according to this invention for making the elastically stretchable composite sheet allows a basis weight of fibrous web in the composite sheet to be smaller than when the previously stretched fibrous web is joined to the elastic web in the manner of prior art, since the stretchable fibrous web is laminated with and joined to the elastic web in its non-stretched state and then this lamination is stretched. The fibrous web is formed by fiber containing ethylene/propylene copolymer, ethylene/propylene/butane copolymer or the like at 100~10% by weight. This fiber is not subjected to any significant progress of crystallization in the course of stretching and thinning by spinning. Therefore, the web comprising the fibrous web and the elastic web laminated with and joined to each other can be stretched at a high ratio without any restriction by the fibrous web and the continuous fibers can be further thinned by stretching them. A difference of melting point between the elastic web and the fibrous web is sufficiently small to facilitate these two webs to be properly embossed together.

The individual fibers forming the fibrous web are plastically deformed and thinned, on one hand, and dissolved from heat-sealing or entangling effect as the composite sheet is stretched once in the course of making this composite sheet. With a consequence, a relatively small force required to stretch the elastic stretchable web alone is sufficient to initially stretch this composite sheet. In this way, the composite sheet has a high stretchability as well as a comfortable touch.

What is claimed is:

1. A stretchable composite sheet comprising:
   an elastic sheet having a stretchability in at least one of two directions that are orthogonal to each other; and
   a fibrous assembly in the form of a sheet having a stretchability in one of said at least two directions and joined to at least one surface of said elastic sheet, said fibrous assembly comprising a plurality of fibers and having an inelastic stretchability and being joined to said elastic sheet at binding spots to form a joined composite sheet structure which is thereafter stretched so as to change the dimensions of the fibers in the fibrous assembly and the elastic stretchability of the composite sheet, said binding spots being arranged intermittently along said two directions, said fibrous assembly comprising fibers that are curved between adjacent pairs of said binding spots along said one of said at least two directions, said fibers comprising ethylene/propylene copolymer containing ethylene at 0.5-10% by weight, ethylene/propylene/butene containing ethylene at 0.5-10% by weight and butene at 0.5-15% by weight, or a mixture thereof at 100-10% by weight.

2. The stretchable composite sheet according to claim 1, wherein said fibers luther comprise propylene homopolymer from greater than 0% to 90% by weight.

3. The stretchable composite sheet according to claim 1, wherein said elastic sheet and said fibrous assembly are heat-sealed with each other at said binding spots.

4. A stretchable composite sheet obtained by:
   a) providing a first web made of a thermoplastic synthetic fiber and being inelastically stretchable in one direction, said web being formed from fibers that comprise ethylene/propylene copolymer containing ethylene at 0.5-10% by weight, ethylene/propylene/butene containing ethylene at 0.5-10% by weight and butene at 0.5-15% by weight, or a mixture thereof at 100-10% by weight and having a breaking extension of at least 150%;
   b) providing a second web made of thermoplastic resin and being elastically stretchable at least in said one direction, said second web being elastically stretchable by at least 80% in said one direction;
   c) continuously feeding said first web in said one direction;
   d) continuously feeding said second web in said one direction and placing said second web upon said first web;
   e) joining said first and second webs having been placed upon each other in step d) to each other intermittently in said one direction and in the direction orthogonal so said one direction, at least in said one direction to form a composite web;
   f) stretching said first and second webs having been joined to each other in step e) in said one direction and said direction orthogonal to said one direction, at least in said one direction within an elasticity limit of said second web and within a breaking extension of said first web so as to change the dimensions of the fibers in the first web and the elastic stretchability of the composite web; and
   g) allowing the first and second webs having been stretched in step f) contract to obtain said composite sheet.

5. The stretchable composite sheet according to claim 1, wherein said fibers comprise ethylene/propylene copolymer containing ethylene at 0.5-10% by weight, ethylene/propylene/butene containing ethylene at 0.5-10% by weight and butene at 0.5-15% by weight, or mixtures thereof at 100% by weight.

* * * * *

UNITED STATES PATENT AND TRADEMARK OFFICE
CERTIFICATE OF CORRECTION

PATENT NO.       : 7,300,895 B2                                       Page 1 of 1
APPLICATION NO.  : 09/766275
DATED            : November 27, 2007
INVENTOR(S)      : Toshio Kobayashi and Hiroyuki Ohata It is certified that error appears in the above-identified patent and that said Letters Patent is hereby corrected as shown below:

Claim 2, Column 9, line 36 should be changed from:

"wherein said fibers luther comprise propylene homopolymer"

TO

--wherein said fibers further comprise propylene homopolymer--

Signed and Sealed this

Thirteenth Day of May, 2008

JON W. DUDAS
*Director of the United States Patent and Trademark Office*